United States Patent
Kim et al.

(10) Patent No.: US 9,535,208 B2
(45) Date of Patent: Jan. 3, 2017

(54) BENDABLE DISPLAY APPARATUS HAVING A GUIDE UNIT WHICH GUIDES A LIGHT GUIDE PLATE

(71) Applicant: SAMSUNG ELECTRONICS CO., LTD., Suwon-si (KR)

(72) Inventors: Beom Han Kim, Seoul (KR); Jun Su Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 14/588,784

(22) Filed: Jan. 2, 2015

(65) Prior Publication Data
US 2015/0192731 A1    Jul. 9, 2015

(30) Foreign Application Priority Data

Jan. 6, 2014  (KR) .................. 10-2014-0001249
Dec. 11, 2014 (KR) .................. 10-2014-0178643

(51) Int. Cl.
*F21V 8/00* (2006.01)
*G02F 1/1333* (2006.01)

(52) U.S. Cl.
CPC .......... *G02B 6/0088* (2013.01); *G02B 6/0011* (2013.01); *G02B 6/0045* (2013.01); *G02B 6/0073* (2013.01); *G02B 6/0081* (2013.01); *G02F 1/133308* (2013.01); *G02F 2001/133322* (2013.01); *G02F 2201/46* (2013.01)

(58) Field of Classification Search
CPC ... G02B 6/0088; G02B 6/0045; G02B 6/0081; G02B 6/0011; G02F 1/133305; G02F 1/133308
See application file for complete search history.

(56) References Cited

U.S. PATENT DOCUMENTS

| | | | |
|---|---|---|---|
| 7,667,786 B2 * | 2/2010 | Nouchi | G02B 6/0088 349/58 |
| 7,920,223 B2 * | 4/2011 | Nishizawa | G02F 1/133308 349/58 |
| 8,139,177 B2 * | 3/2012 | Nishizawa | G02F 1/133305 349/58 |
| 9,113,553 B2 * | 8/2015 | An | H05K 5/0217 |
| 2009/0096965 A1 | 4/2009 | Nagata | |

FOREIGN PATENT DOCUMENTS

| | | |
|---|---|---|
| EP | 2680065 A1 | 1/2014 |
| WO | 2013/172538 A1 | 11/2013 |

OTHER PUBLICATIONS

Communication from the European Patent Office issued Jun. 8, 2015 in a counterpart European Application No. 14198744.6.

* cited by examiner

*Primary Examiner* — Robert May
(74) *Attorney, Agent, or Firm* — Sughrue Mion, PLLC

(57) ABSTRACT

A display apparatus in which a display module in a state of a curved surface is provided. The display apparatus includes: a display panel configured to display an image and which is bendable; a light guide plate which guides light toward the display panel; and a guide unit which guides the light guide plate to be maintained in a state of a curved surface, wherein the guide unit includes a shape of a curved surface in which both ends of the guide unit protrude forward relative to a center portion of the guide unit.

13 Claims, 6 Drawing Sheets

BENDABLE DISPLAY APPARATUS HAVING A GUIDE UNIT WHICH GUIDES A LIGHT GUIDE PLATE

CROSS-REFERENCE TO RELATED APPLICATION

This application claims priority from Korean Patent Application Nos. P10-2014-0001249 and P10-2014-0178643, filed on Jan. 6, 2014 and Dec. 11, 2014, respectively, in the Korean Intellectual Property Office, the disclosures of which are incorporated herein by reference in their entirety.

BACKGROUND

1. Field

Apparatuses consistent with exemplary embodiments relate to a display apparatus in which a display module in a state of a curved surface can be used.

2. Description of the Related Art

In general, a display apparatus is an apparatus including a display module on which an image is displayed. The display apparatus includes a television (TV) or monitor. Some display apparatuses use a display module including an organic light-emitting diode panel.

Since the organic light-emitting diode panel is formed of a bendable material in a predetermined range, a display apparatus in which the display panel is fixedly installed in a state of a curved surface and in which a user can partially feel a three-dimensional (3D) effect like in a 3D image, through a two-dimensional (2D) image, has been recently suggested.

SUMMARY

Therefore, it is an aspect of an exemplary embodiment to provide a display apparatus in which a display module can be used in a state of a curved surface.

It is another aspect of an exemplary embodiment to provide a display apparatus including a guide unit for guiding a light guide plate used in a curved surface display panel to a curved surface.

Additional aspects of an exemplary embodiment will be set forth in part in the description which follows and, in part, will be obvious from the description, or may be learned by practice of the invention.

In accordance with one aspect of an exemplary embodiment, there is provided a display apparatus including: a display panel configured to display an image, wherein the display panel is bendable; a light guide plate which guides light toward the display panel; and a guide unit which guides the light guide plate to be maintained in a state of a curved surface, wherein the guide unit may include a shape of a curved surface in which both ends of the guide unit protrude forward relative to a center portion of the guide unit.

The guide unit may include: a rear support portion having a shape of a curved surface, wherein the rear support portion is provided to support a rear surface of the light guide plate; a front support portion provided in front of the rear support portion so as to support a front surface of the light guide plate; and a connection support portion that connects the front support portion and the rear support portion.

Each of the rear support portion and the front support portion may have a shape of a curved surface in which both ends of each of the rear support portion and the front support portion protrude forward.

The guide unit may include at least one from among steel and steel sheet. The steel and/or the steel sheet may comprise electro-galvanized, cold-rolled steel.

The guide unit may include a space portion into which the light guide plate is insertable.

The space portion may be formed between the front support portion and the rear support portion.

The guide unit may be provided at at least one from among an upper side and lower side of the light guide plate.

The display apparatus may further include a plurality of light emitting diode modules, wherein the plurality of light emitting diode modules are disposed perpendicular to the guide unit.

One of the steel and the steel sheet may include electro-galvanized, cold-rolled steel.

In accordance with another aspect of an exemplary embodiment, there is provided a display apparatus including: a display panel on which an image is displayed; a light guide plate which guides light toward the display panel; a guide unit which guides the light guide plate to be maintained in a state of a curved surface; a chassis provided to accommodate the light guide plate and the guide unit; and at least one circuit board disposed on a side surface of the chassis in a flat state, wherein the display panel is curved in a shape corresponding to that of the curved light guide plate.

The guide unit may include: a rear support portion having a shape of a curved surface, the rear support portion being provided to support a rear surface of the light guide plate; a front support portion provided in front of the rear support portion so as to support a front surface of the light guide plate; and a connection support portion that connects the front support portion and the rear support portion.

Each of the rear support portion and the front support portion may have a shape of a curved surface in which both ends of each of the rear support portion and the front support portion protrude forward.

The guide unit may include a space portion into which the light guide plate is insertable.

The space portion may be formed between the front support portion and the rear support portion.

The guide unit may be provided at at least one from among an upper side and lower side of the light guide plate.

BRIEF DESCRIPTION OF THE DRAWINGS

These and/or other aspects of exemplary embodiments will become apparent and more readily appreciated from the following description of the exemplary embodiments, taken in conjunction with the accompanying drawings of which.

DETAILED DESCRIPTION

Figure 1:
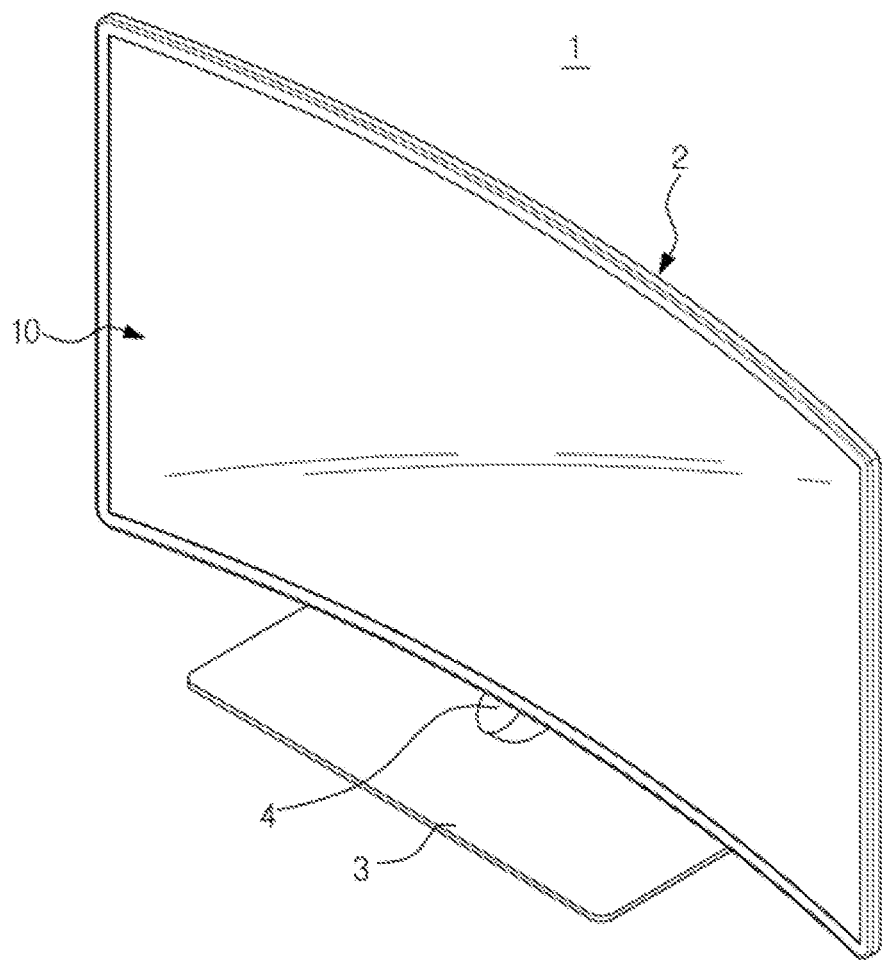
FIG. 1 is a perspective view schematically illustrating a curved surface display apparatus according to an exemplary embodiment.

Reference will now be made in detail to the embodiments of the present invention, examples of which are illustrated in the accompanying drawings, wherein like reference numerals refer to like elements throughout.

Figure 2:
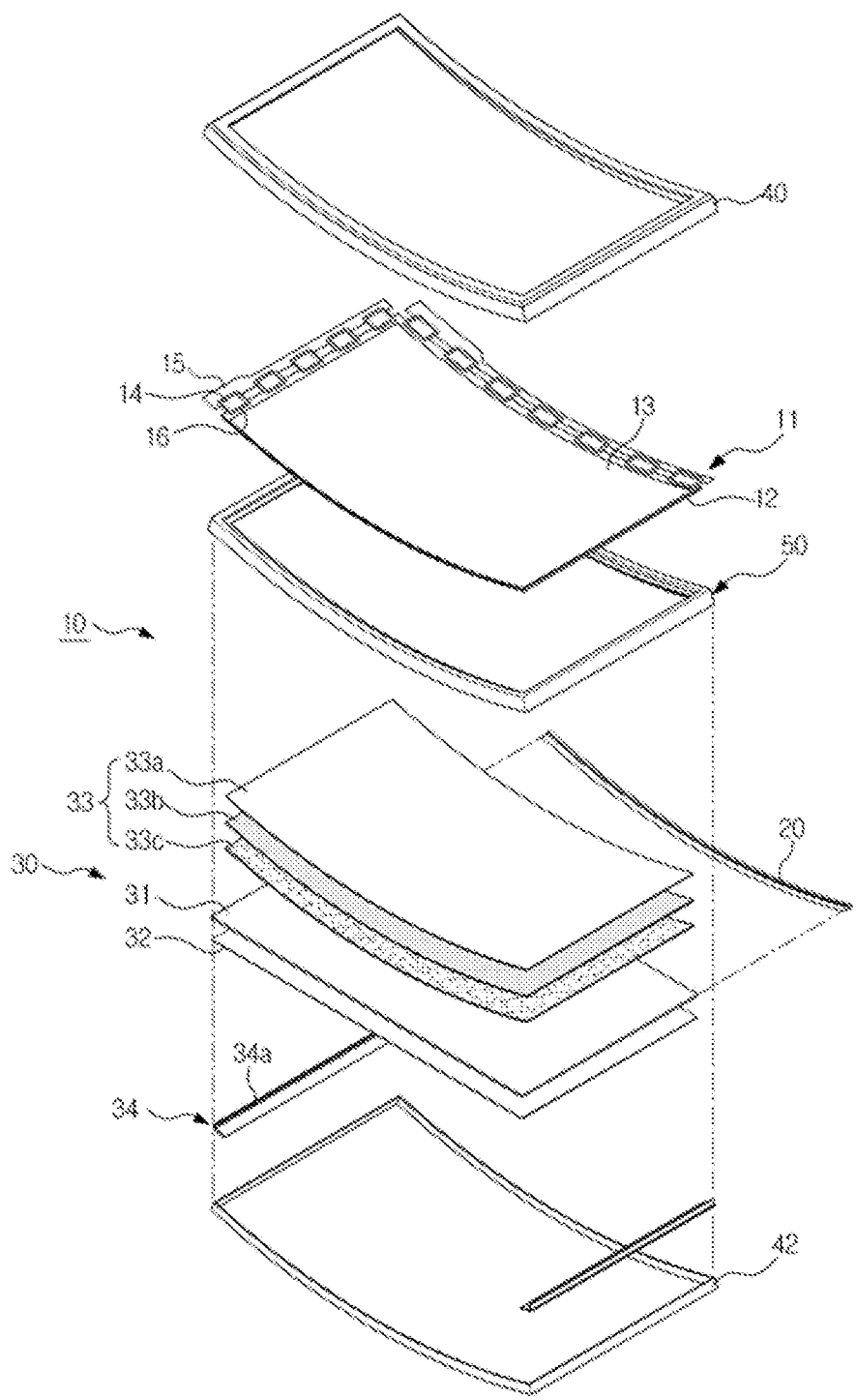
FIG. 2 is an exploded perspective view schematically illustrating the curved surface display apparatus illustrated in FIG. 1.

FIG. 1 is a perspective view schematically illustrating a curved surface display apparatus according to an exemplary embodiment, and FIG. 2 is an exploded perspective view schematically illustrating the curved surface display apparatus illustrated in FIG. 1.

As illustrated in FIGS. 1 and 2, the display apparatus 1 includes a display module 10 that displays image information, and a case 2 that is disposed at an outer side of the display module 10 and protects the display module 10 and electronic components in the display module 10.

A power supply unit that provides power required to drive the display module 10 and a driving mode through which electrical signals provided from the outside are converted into images and sound, may be provided in the case 2.

A base 3 may be provided below the case 2 and may be supported on an installation surface on which the display apparatus 1 is to be installed. The display module 10 and the base 3 may be connected to each other by a stand 4 that is provided perpendicular to the base 3.

The case 2 is formed to be curved so that both ends of the case 2 protrude forward while a center portion of the display apparatus 1 does not protrude forward, and a front surface and a rear surface of the case 2 are formed as curved surfaces.

The display module 10 may include a liquid crystal display panel 11, a backlight unit 30 disposed to be spaced from a lower portion of the liquid crystal display panel 11, a middle mold 50 that supports the liquid crystal display panel 11 and the backlight unit 30 so as to be spaced apart from each other by a predetermined gap, a top chassis 40 disposed on the liquid crystal display panel 11, and a bottom chassis 42 disposed under the backlight unit 30.

The liquid crystal display panel 11 includes a thin film transistor substrate 12 in which a thin film transistor is formed, a color filter substrate 13 that faces the thin film transistor substrate 12, and a liquid crystal layer (not shown) provided between the thin film transistor substrate 12 and the color filter substrate 13.

Flexible printed circuit boards (FPCBs) 16, driving chips 14 mounted on the FPCBs 16, and a panel circuit board 15 that is connected to the other side of the FPCBs 16 are provided at one side of the thin film transistor substrate 12.

The above-described liquid crystal display panel 11 may form an image by adjusting the arrangement of liquid crystal layers but is not self-luminescent. Thus, the liquid crystal display panel 11 may display an image only by light supplied from the backlight unit 30 placed on a rear surface of the liquid crystal display panel 11.

The backlight unit 30 includes a plurality of optical sheets 33a, 33b, and 33c disposed under the liquid crystal display panel 11, a light guide plate 31 placed under the plurality of optical sheets 33a, 33b, and 33c, a reflective sheet 32 placed on a bottom surface of the light guide plate 31, and a light-emitting diode module 34 that supplies light onto the light guide plate 31.

The optical sheets 33 include a protective film 33a, a prism film 33b, and a diffusion film 33c.

The protective film 33a is disposed on the prism film 33b and protects the prism film 33b that is sensitive to a scratch, such as dust.

A trigonal prism with uniform arrangement is formed on a top surface of the prism film 33b so that light diffused by the diffusion film 33c can be concentrated in a direction perpendicular to a plane of the upper liquid crystal display panel 11. Two pieces of prism films 33b are generally used, and a microprism formed on each prism film 33b forms a predetermined angle. Most of the light that passes through the prism films 33b proceeds vertically so that uniform brightness distribution can be provided.

A bead-shaped coating layer is formed on a base plate of the diffusion film 33c so that the diffusion film 33c may diffuse light from the light guide plate 31 and supply diffused light to the liquid crystal display panel 11.

The light guide plate 31 is formed of an acryl-based resin, such as polymethyl methacrylate (PMMA) or polymethylstyrene and uniformly supplies light from the light-emitting diode module 34 to the diffusion film 33c. Here, sides of the light guide plate 31 that face the light-emitting diode module 34 serve as an incidence surface onto which light emitted from the light-emitting diode module 34 is incident, and a front surface of the light guide plate 31 that faces the diffusion film 33c serves as an exit surface from which light is emitted, and a rear surface of the light guide plate 31 that is provided at an opposite side to the exit surface of the light guide plate 31 and faces the reflective sheet 32, serves as a reflective surface on which light is reflected.

The reflective sheet 32 is disposed under the light guide plate 31 and guides light emitted through a bottom surface of the light guide plate 31 to the light guide plate 31 again. The reflective sheet 32 may be formed of a plastic material, such as polyethylene terephthalate (PET) or polycarbonate (PC).

Two light-emitting diode modules 34 are provided and are disposed to face each of two symmetrical sides among four sides of the light guide plate 31. Each of the two light-emitting diode modules 34 may include a plurality of light-emitting diodes 34a that emit light and the FPCBs 16 in which the plurality of light-emitting diodes 34a are disposed and conductive patterns that transfer electrical signals to the plurality of light-emitting diodes 34a are formed.

One from among a plurality of circuit boards including the FPCBs 16, the driving chips 14, and the panel circuit board 15 may be disposed on side edges of the top chassis 40 and the bottom chassis 42 in a flat state. In an embodiment of the present invention, at least one circuit board is disposed at one side and an upper side of left and right sides of the top chassis 40 and the bottom chassis 42. However, embodiments of the present invention are not limited thereto. For example, the circuit board may be disposed on one side surface among the edges of the top chassis 40 and the bottom chassis 42.

These circuit boards may be provided at the top chassis 40 and the bottom chassis 42 in the flat state so that the display module 10 in the state of the curved surface may be supported on the top chassis 40 and the bottom chassis 42 in the state of the curved surface.

The top chassis 40 is configured in a shape of a rectangular ring, supports an outer side of a front surface of the display panel 11, and provides support so that a state in which the display module 10 is installed at the bottom chassis 42, can be maintained.

The bottom chassis 42 is configured in a shape of a plate and is provided to constitute a rear surface of the display panel 11 and also such that the backlight unit 30 can be mounted on the bottom chassis 42.

The top chassis 40 and the bottom chassis 42 may be curved so that both ends of each of the top chassis 40 and the bottom chassis 42 may protrude forward instead of a center portion of the display apparatus 1 protruding, so as to correspond to the shape of the case 2.

In this case, a guide unit 20 that deforms the light guide plate 31 formed as a flat surface so as to have a curved surface and maintains the curved surface, may be provided on the light guide plate 31.

The guide unit 20 may be installed at a top end of the light guide plate 31. In the current embodiment of the present invention, the guide unit 20 is installed at the top end of the light guide plate 31. However, exemplary embodiments are not limited thereto. For example, the guide unit 20 may be disposed at at least one of the top end or bottom end of the light guide plate 31. Also, the guide unit 20 may be installed at each of the top end and the bottom end of the light guide plate 31.

Figure 3:
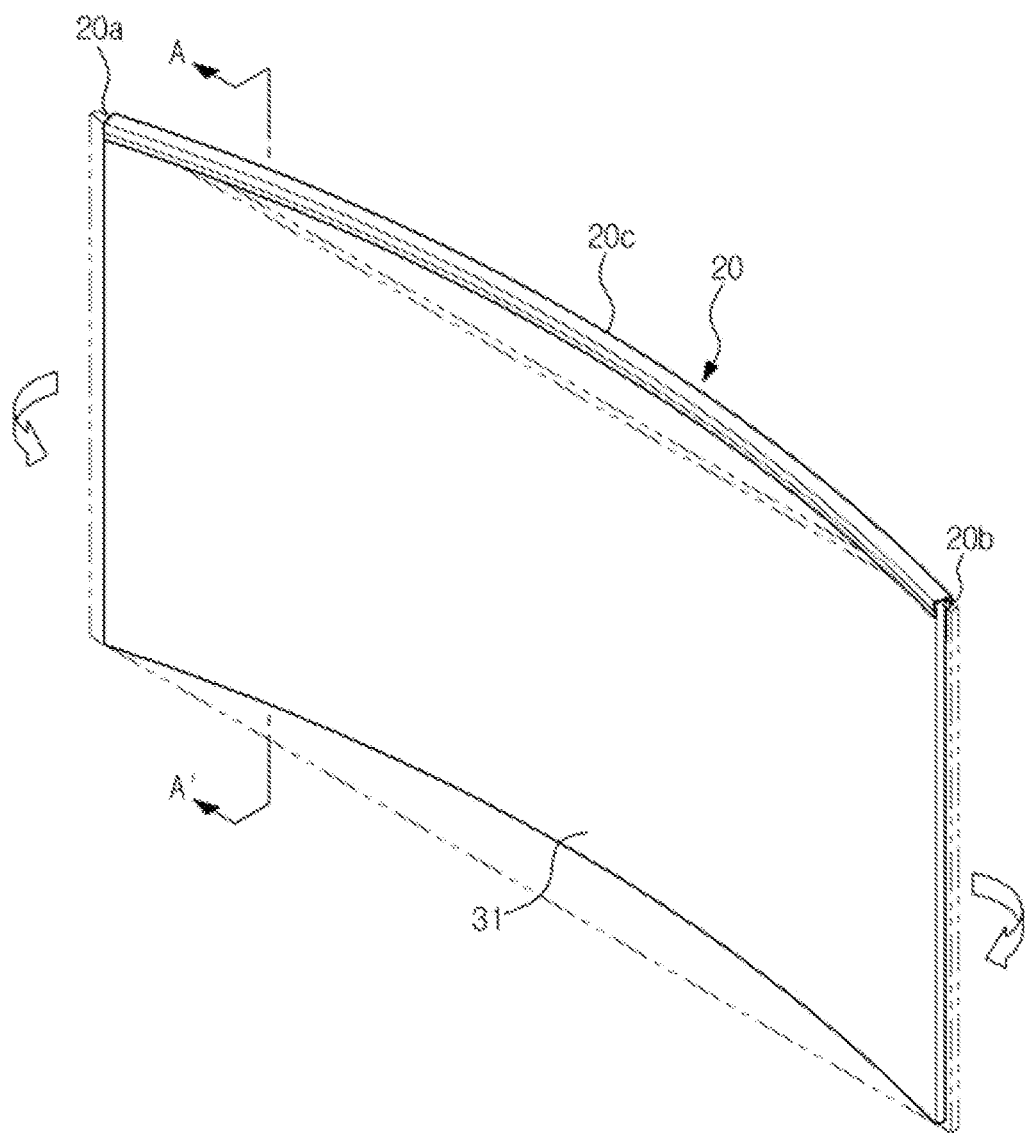
FIG. 3 is a perspective view schematically illustrating a light guide plate on which a guide unit is mounted, according to an exemplary embodiment.
Figure 4:
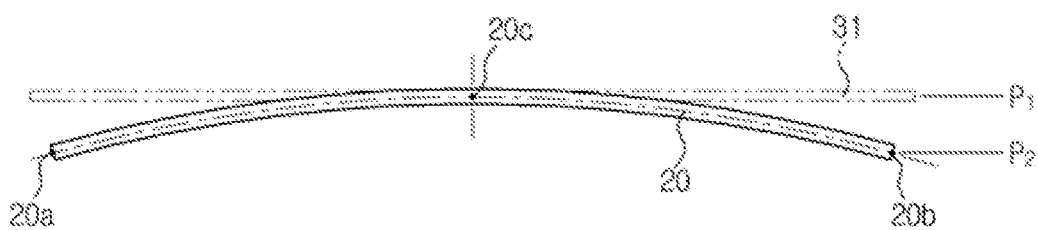
FIG. 4 illustrates the state of a light guide plate on which a guide unit is mounted, according to an exemplary embodiment.
Figure 5:
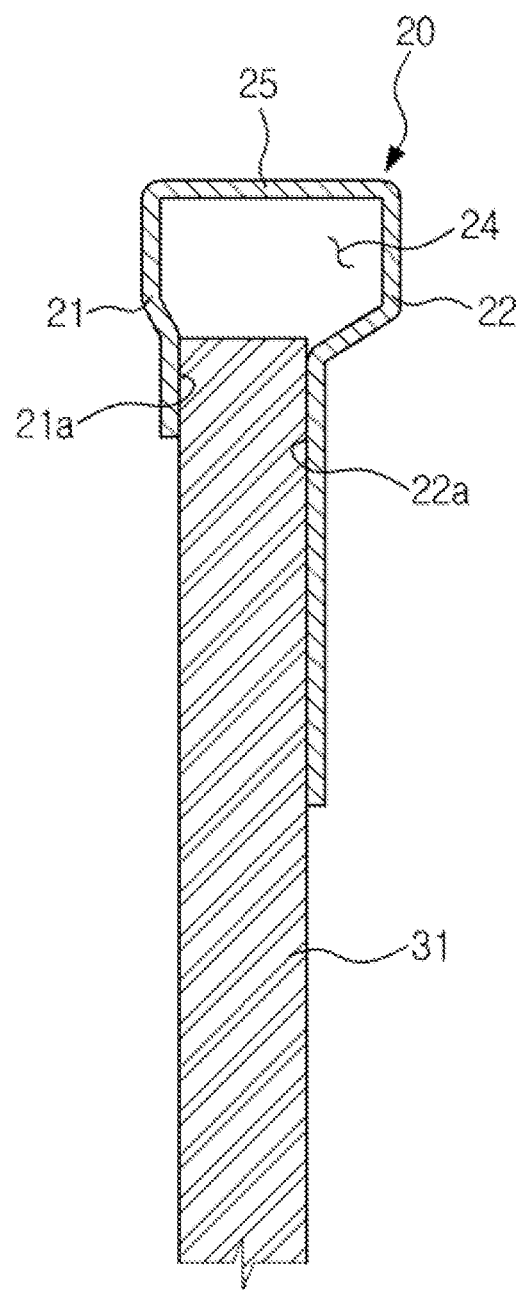
FIG. 5 is a cross-sectional view of a portion A-A' of FIG. 3.

FIG. 3 is a perspective view schematically illustrating a light guide plate on which a guide unit is mounted, according to an exemplary embodiment, FIG. 4 illustrates the state of a light guide plate on which a guide unit is mounted, according to an exemplary embodiment, and FIG. 5 is a cross-sectional view of a portion A-A' of FIG. 4.

As illustrated in FIGS. 3 through 5, the guide unit 20 provided to be installed at the light guide plate 31 includes a front support portion 21 provided to support the front surface of the light guide plate 31, a rear support portion 22 provided at a rear surface of the front support portion 21 so as to support a rear surface of the light guide plate 31, and a connection support portion 25 that connects the front support portion 21 and the rear support portion 22.

The guide unit 20 is formed to have a curvature so that both ends of the guide unit 20 protrude forward so as to correspond to the shape of the case 2.

The guide unit 20 may be formed to include at least one material of steel and steel sheet, such as electro-galvanized, cold-rolled steel (SECC).

In this case, at least one of the steel and the steel sheet (SECC) may include electro-galvanized, cold-rolled steel.

The guide unit 20 includes a first end 20a as an end formed at one side of the guide unit 20, a second end 20b as an end formed at the other side of the guide unit 20, and a center portion 20c formed in the center of the first end 20a and the second end 20b.

A position P1 of the center portion 20c of the guide unit 20 may be behind a position P2 of the first end 20a and the second end 20b of the guide unit 20 so that the guide unit 20 can form a curved surface in which both ends of the guide unit 20 protrude forward instead of the center portion of the display apparatus 1 (shown in FIG. 4).

A space portion 24 into which the light guide plate 31 may be inserted, is formed between the front support portion 21 and the rear support portion 22 of the guide unit 20 (shown in FIG. 5).

Thus, if the light guide plate 31 is inserted into the space portion 24 of the guide unit 20, the light guide plate 31 having the flat surface shape may be guided by the guide unit 20 so that the light guide plate 31 can be deformed in a shape of a curved surface in which both ends of the light guide plate 31 protrude forward instead of the center portion of the display apparatus 1.

In this case, the front surface of the light guide plate 31 contacts and is supported on a front support portion contact surface 21a of the front support portion 21, and the rear surface of the light guide plate 31 contacts and is supported on a rear support portion contact surface 22a of the rear support portion 22 so that realization of the curved surface of the light guide plate 31 can be smoothly guided.

Figure 6:
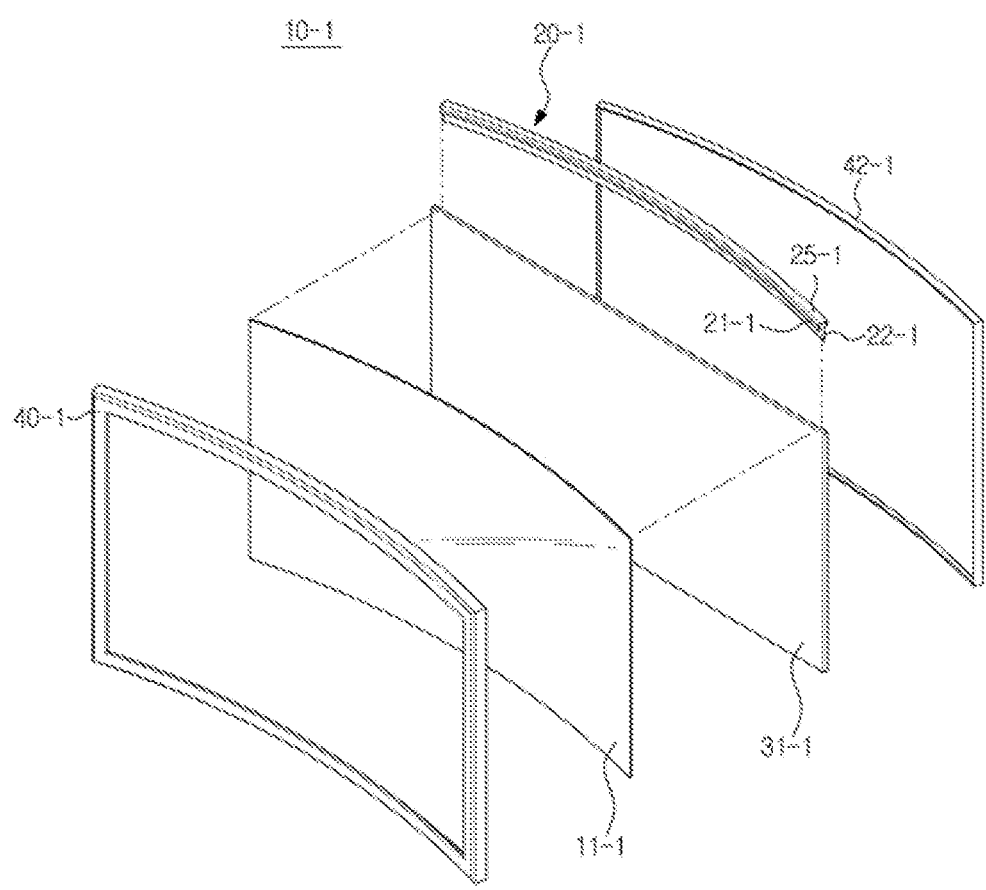
FIG. 6 is an exploded perspective view schematically illustrating a guide unit of a curved surface display module light guide plate according to another exemplary embodiment.

In the above exemplary embodiment, a display apparatus including a liquid crystal display panel and a backlight unit has been described. However, exemplary embodiments are not limited thereto. For example, as illustrated in FIG. 6, the exemplary embodiments may be applied to a display apparatus including a display panel 11-1 having a shape of a flexible film and configured of an organic light-emitting diode provided to be easily bent and a light guide plate 31-1.

The display module 10-1 includes the display panel 11-1 on which an image is displayed, a bottom chassis 42-1 that supports a rear surface of the display panel 11-1, and a top chassis 40-1 provided to cover an outer side of a front surface of the display panel 11-1.

In this case, the display panel 11-1 may include an organic light-emitting diode panel.

Also, a heat-dissipating sheet (not shown) that causes heat generated in the display panel 11-1 to be dispersed and dissipated within a shorter time, an insulation sheet (not shown) that is formed of an insulating material, is disposed between the heat-dissipating sheet and the bottom chassis 42-1, and prevents heat generated in the display panel 11-1 from being transferred backward, a reinforcement member (not shown) for reinforcing strength of the bottom chassis 42-1, and the light guide plate 31-1 may be installed at the rear surface of the display panel 11-1.

A guide unit 20-1 may be provided at at least one of top and bottom ends of the light guide plate 31-1 so as to deform the light guide plate 31-1 formed as a flat surface to a curved surface and to maintain the deformation.

The guide unit 20-1 provided to be installed at the light guide plate 31-1 includes a front support portion 21-1 provided to support a front surface of the light guide plate 31-1, a rear support portion 22-1 provided at a rear surface of the front support portion 21-1 so as to support a rear surface of the light guide plate 31-1, and a connection support portion 25-1 that connects the front support portion 21-1 and the rear support portion 22-1.

The guide unit 20-1 may be formed to have a curvature so that both ends of the guide unit 20-1 protrude forward so as to correspond to shapes of the top chassis 40-1 and the bottom chassis 42-1.

According to the one or more exemplary embodiments, a display module in a state of a curved surface can be used so that various viewing angles can be realized.

Furthermore, a light guide plate used in the curved surface display panel can be guided to the curved surface so that a mura phenomenon caused by a change in curvature can be prevented and the quality of a product can be improved.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display module comprising: a display panel configured to display an image, wherein the display panel is bendable; a light guide plate which guides light toward the display panel; a guide unit which guides the light guide plate to be maintained in a state of a curved surface; and a chassis configured to accommodate the guide unit and the light guide plate, wherein the guide unit comprises a shape of the curved surface in which both ends of the guide unit protrude forward relative to a center portion of the guide unit, wherein the guide unit comprises: a rear support portion having a shape of the curved surface and the rear support portion is provided to support a rear surface of the light guide plate; a front support portion provided in front of the rear support portion so as to support a front surface of the light guide plate; and a connection support portion that connects the front support portion and the rear support portion.

2. The display module of claim 1, wherein each of the rear support portion and the front support portion has a shape of a curved surface in which both ends of each of the rear support portion and the front support portion protrude forward.

3. The display module of claim 2, wherein the guide unit includes a space portion into which the light guide plate is insertable.

4. The display module of claim 3, wherein the space portion is formed between the front support portion and the rear support portion.

5. The display module of claim 1, wherein the guide unit comprises at least one from among steel and steel sheet.

6. The display module of claim 5, wherein one of the steel and the steel sheet comprises electro-galvanized, cold-rolled steel.

7. The display module of claim 1, wherein the guide unit is provided at at least one from among an upper side and lower side of the light guide plate.

8. The display module of claim 1, further comprising a plurality of light emitting diode modules, wherein the plurality of light emitting diode modules are disposed perpendicular to the guide unit.

9. A display apparatus comprising: a display panel on which an image is displayed; a light guide plate which guides light toward the display panel; a guide unit which guides the light guide plate to be maintained in a state of a curved surface; a chassis configured to accommodate the guide unit and the light guide plate; and at least one circuit board disposed on a side surface of the chassis in a flat state, wherein the display panel is curved in a shape corresponding to that of the curved light guide plate, wherein the guide unit comprises: a rear support portion having a shape of the curved surface, the rear support portion being provided to support a rear surface of the light guide plate; a front support portion provided in front of the rear support portion so as to support a front surface of the light guide plate; and a connection support portion that connects the front support portion and the rear support portion.

10. The display apparatus of claim 9, wherein each of the rear support portion and the front support portion has a shape of a curved surface in which both ends of each of the rear support portion and the front support portion protrude forward.

11. The display apparatus of claim 10, wherein the guide unit includes a space portion into which the light guide plate is insertable.

12. The display apparatus of claim 11, wherein the space portion is formed between the front support portion and the rear support portion.

13. The display apparatus of claim 9, wherein the guide unit is provided at at least one from among an upper side and lower sides of the light guide plate.

* * * * *